S. T. Jennings
Stereoscope.
Nº 103,817.  Patented May 31, 1870.
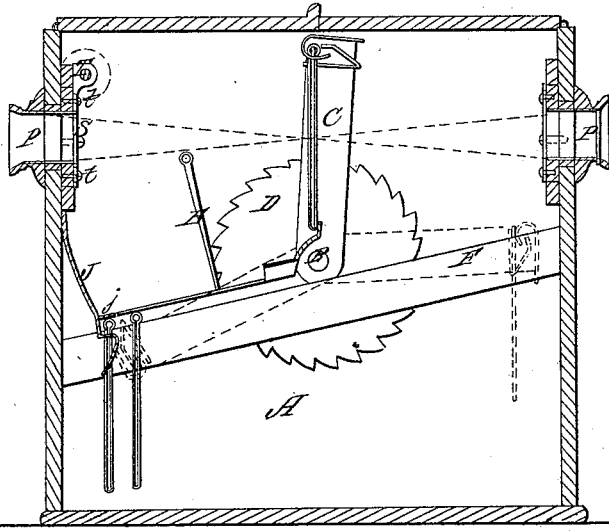
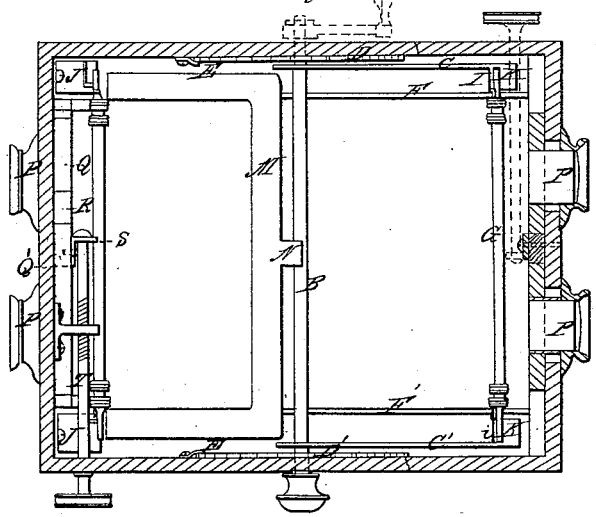
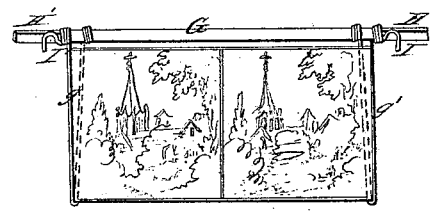
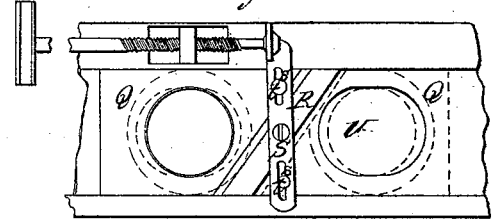
Witnesses:
H. G. Webber
Samuel Knight
S. T. Jennings, Inventor
By Knight Bro.
att'ys

United States Patent Office.

SILAS T. JENNINGS, OF CINCINNATI, OHIO.

Letters Patent No. 103,817, dated May 31, 1870.

---

IMPROVEMENT IN BOX STEREOSCOPES.

---

The Schedule referred to in these Letters Patent and making part of the same.

---

*To whom it may concern:*

Be it known that I, SILAS T. JENNINGS, of Cincinnati, Hamilton county, Ohio, have invented a new and useful Improvement in Stereoscopes; and I hereby declare the following to be a full, clear, and exact description of the same, reference being had to the accompanying drawing making part of this specification.

My invention relates to that class of devices by which a series of duplicate photographic pictures are mechanically adjusted in the focus of a pair of stereoscopic lenses, and consists in a device whereby the said photographic pictures are taken up seriatim, (by arms attached to a revolving shaft, which traverses the customary box,) and are suspended at a point equidistant from and in the common focus of two pairs of stereoscopic lenses on opposite sides of the box.

It possesses the advantages of simplicity, certainty of action, and of adjusting the card in the proper focus without vibration.

It also has attached to it an apparatus for adjusting the lenses at a greater or lesser distance apart, to suit the eyes of the observer.

Figure 1 is a vertical section through a stereoscopic instrument embodying my invention.

Figure 2 is a transverse section of the same.

Figure 3 represents my method of mounting the cards on which the pictures are affixed.

Figure 4 represents the mechanism for the adjustment of the lenses.

The customary box A is traversed by a shaft, B, having at each end an arm, C, to the extremity of which is affixed the carriage or apparatus by which the cards are moved.

Ratchet-wheels D D' attached to the shaft, and pawls E E' engaging in the teeth of these wheels, admit of its revolution in only one direction. The shaft is rotated by a crank, knob, or equivalent device on the exterior of the box.

At right angles to the shaft, and at a sufficient distance from the sides of the box to allow arms C C' to rotate outside of them, are two inclined rails of metal F F, upon which the picture cards are supported by means of a wire frame, in which they are fixed. This frame consists of a wire, G, fig. 3, somewhat longer than the card, projecting equally at either end, and having two flattened loops of wire $g\ g'$, each of which receives one end of the picture card. The projecting ends H H' are flattened, so as to give them an oblong cross-section, of which the longest dimension is in the plane of the picture.

Hooks I I', embracing the rails F F', retain the frames in their proper position on the rails.

Springs J J', near the lower end of the rails, act to stop the picture frames, sliding down the inclined rails at the proper point to be taken up by the carriage in its revolution, and are provided with bent arms $j\ j$, whose operation is hereafter described.

The carriage consists of two curved flanges of metal $k\ l$ affixed to the extremity of the arm C, each flange traversing the width of the arm, and curving back upon itself in such a manner as to present a Z-shaped passage or interval, which passage, at either end and in the middle, has a width corresponding to the smaller dimension of the flattened ends of the wire frames H H of the picture.

The carriage arriving in its revolution below the rails upon which the pictures are supported, their weight holding the wire with its greatest dimension in a perpendicular position, and the smaller at right angles to the slot or opening between the flanges, the spring J is pressed back by the ascending carriage, the bent arm $j$ is withdrawn, the ends H H of the wire pass into the slot between the flanges $k\ l$ until they encounter the recurved loop of the flange $k$, when it is lifted from the rails. The card hanging perpendicularly from the wire as the arms revolve has relatively changed its position in the carriage to one at right angles to its entrance, when the arms reach an upright position, thus bringing the greater diameter of the wire across the slot, whereby it is prevented from passing the narrow passage between the ends of the flanges.

A bridge, M, of metal, crossing the box near and parallel to the shaft B, supports, at its midlength, a tongue, N, which, rising perpendicularly above the shaft, detains the lower edge of the picture O when that has reached a position half way between the lenses, thus preventing vibration, and the picture hangs adjusted in the common focus of the lenses.

The revolution of the axle and carriage being continued, the minor axis of the wires H H' again becomes opposed to the slot $k\ l$, and the frame falls into the recurved loop of the flange $l$, resting in which, when the carriage arrives at the upper end of the rails F F', the hooks I I' engage the rails, the frame is left behind by the carriage, and slides by its own weight down the inclined railway to the lower end to be taken up again in its turn.

A cover, $m$, of metal, over the lower portion of the rails, prevents any picture from being lifted by the carriage, except the one set free by the retraction of the arms $j\ j'$ of the springs J J.

The lenses P P, in their customary frames or holders, are attached to slides Q Q' in the interior of the box, (see fig. 4,) the slides being divided diagonally, having an immovable bar, R, between them, on which is pivoted at its center a lever, S, having in each end a slot, $s\ s'$, which embrace the heads of screws $t\ t$ in the slides. A thumb-screw, T, whose head is outside of the box, connects with the lever R, and by its partial revolution adjusts the slides, which are drawn together by the forward action of the screw, and pushed apart by its retraction.

Oval slots U U' in the box allow of this horizontal motion of the slides, and the flanges of the holders are made sufficiently wide to entirely cover these slots and prevent any entrance of light.

I claim herein as new and of my invention—

1. In the described combination, the revolving arms O O', the carriage composed of the flanges $k\ l$, the railway F F', the springs J J', the tongued bridge M N, and the rail cover $m$, for the purpose of adjusting a series of stereoscopic views in the focus of two pairs of lenses, as shown and set forth.

2. A sloping railway F F', on which the frames containing the pictures, when released by the carriage, traverse the box by the force of gravity, automatically returning to their original position in contact with the springs J J'.

3. The wire frames in which pictures are mounted, having extended flattened ends or tongues H H for retention within the carriage, except when in the liberating positions herein designated for the purpose, and hooks I I' to embrace the rails and retain the pictures upon them.

4. The carriage, composed of the two curved flanges $k\ l$, substantially as shown and set forth.

5. The tongued bridge M N, or its mechanical equivalent, for steadying the lower edge of the picture, when at the proper focal position, and preventing vibration.

In testimony of which invention I hereunto set my hand.

SILAS T. JENNINGS.

Witnesses:
GEO. H. KNIGHT,
JAMES H. LAYMAN.